(12) United States Patent
Offer et al.

(10) Patent No.: US 6,373,019 B1
(45) Date of Patent: Apr. 16, 2002

(54) APPARATUS AND METHODS FOR PROCESSING A SUBMERGED WORK SURFACE

(75) Inventors: Henry P. Offer, Los Gatos; Siamak Bourbour, San Jose; William F. Bowen, Santa Cruz; Bryan K. Chavez; Ron B. Ninomiya, both of San Jose, all of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/590,677

(22) Filed: Jun. 9, 2000

(51) Int. Cl.[7] .................................................. B23K 9/00
(52) U.S. Cl. ........................................................ 219/72
(58) Field of Search ............................. 219/72, 74, 75, 219/136

(56) References Cited

U.S. PATENT DOCUMENTS 4,172,974 A * 10/1979 Stingelin et al. ............... 219/72
5,750,954 A * 5/1998 White et al. .................... 219/72
5,852,271 A * 12/1998 Offer ............................... 219/72
6,255,616 B1 * 7/2001 Offer ............................... 219/72

* cited by examiner

Primary Examiner—Clifford C. Shaw
(74) Attorney, Agent, or Firm—Nixon & Vanderhye

(57) ABSTRACT

An underwater exclusion device includes a housing for a welding torch having leading and trailing arrays of pivotal fingers for engaging in grooves along a work surface to exclude water from an exclusion area within the housing containing the welding torch. The fingers are pivotally mounted and independently and individually movable under the bias of springs between retracted and extended positions. The fingers have radiussed distal ends for engaging the work surface. Upon application of the device to the work surface, the leading and trailing arrays of fingers are displaced under spring pressure to engage their distal ends against the work surface, excluding water from within the housing. The side walls of the housing carry seals for seating along the work surface to prevent water incursion in gaps between the side walls and the work surface.

32 Claims, 9 Drawing Sheets

APPARATUS AND METHODS FOR PROCESSING A SUBMERGED WORK SURFACE

BACKGROUND OF THE INVENTION

The present invention generally relates to apparatus and methods for processing a submerged work surface and particularly relates to apparatus and methods for excluding a liquid from a submerged work surface thereby affording a local dry area around a processing apparatus such as a welding torch, heating device or stress-relieving device.

Processing applications such as welding, thermal stressing and the like in an underwater or submerged environment require a local dry area around the processing head in order that water can be excluded from the work surface to be processed. For example, in welding underwater, the water must be excluded from the molten metal and nearby heated zone to prevent excessive oxidation, premature cooling and other defects. Inert gas is typically used to displace the water locally around the welding head and to provide a chemically inert atmosphere for the molten metal pool. The work surface in many underwater applications, however, is not smooth or regular, particularly after new or unground weld passes have been applied to a work surface. In these cases, a water exclusion device must have sufficient displacement range to fully comply with the highs and lows of and often abrupt changes in the work surface contour.

For welding applications, water displacement around the weld torch and steam displacement from the heated or cold processing area is best achieved at low gas flow rates to avoid known problems at higher flow rates which may be costly to provide, obscure visibility due to excessive bubble formation or disturb the liquid metal pool or other controlled conditions within the local dry zone. However, for large surface contour changes, a higher gas flow rate must be used to maintain sufficient water exclusion if the limited compliance seal has insufficient range and lifts off of the work surface for a portion of its perimeter, or if an annular gas flow only design without a compliant seal is used to displace the water from within the torch inert gas cup. In both cases, the higher flow rate is needed to maintain the minimum required gas velocity across the increased gap, which maintains the minimum pressure differential across the gap to keep the gas flow direction outward into the water, rather than inward with water or mixed phases counterflowing into the welding processing zone. A design combining the benefits of a compliant seal and a gas flow gap may desirably have an increased compliant range relative to either design type alone, however, the combined design will still retain similar problems as each of these design types has individually.

Existing designs for water or other liquid exclusion devices for underwater applications have three basic principles of operation: (1) mechanically sealing the gap between the work surface and the applicator head, e.g., in a welding environment, a cup-shaped gas-filled component around the torch end; (2) flowing gas across the relatively small controlled width gap between the work surface and the applicator head; or (3) providing diverging water/gas cone flowing across a controlled gap to displace water within the contact area of the cone against the work surface. Design variations combining these principles include a gas-permeable compliant seal for multiple concentric flowing water or gas cones. The designs relying on a compliant seal have an inherently limited practical working range because an elastic element is deformed to provide compliance and this element has a limited strain range (before it deforms plastically or is fully compressed), as well as a significantly increasing force requirement for increasing displacement which must be overcome by applicator head manipulation to maintain the desired position along the contoured surface. The force requirement and high displacements may be reduced somewhat by employing thinner or softer deflecting seal elements. However, these thinner elements are increasingly prone to mechanical damage due to inadvertent overloading during use or by tearing during handling operations or while sliding over work surface asperities and discontinuities.

Designs relying on positive water or gas flow through a gap have the limitation that local contour changes or tilting of the applicator head typically generate a differential gap, resulting in the expected differential gas flow around the perimeter of the gap. When the gap is greater in one area, the flow rate and flow velocity of gases, particularly in the case of welding, also becomes greater at the expense of the flow rate and velocity in the remaining areas of the perimeter having a lesser gap. As the flow is reduced in the areas having a lesser gap, the flow rate falls below the minimum required to hold back the water without surging of the water/gas interface or, catastrophically, reverse flow of the water toward the dry welding or process zone within the applicator head housing occurs.

More particularly, existing water exclusion devices are inherently inefficient for use over grooves in the surface of substrates since there is no provision either to limit the flow clearance between the device and the lowest portion of the groove as it is filled or, in the case of "flow curtain" types of devices, to provide a differential flow over the groove which is greater than the needed amount away from the groove. As a result, the ability of known devices to exclude water using an internal flow rate below that which disturbs the processing, for example, welding, is limited at best or is ineffective at worst. In addition, the effectiveness of these devices to exclude water from within deep grooves is limited. Even when used within the depth limit of the ability of these devices to exclude water in grooves, they are wasteful of purge fluid since the flow occurring in areas away from the groove is greater than required in order to have sufficient flow over the groove itself. In the worst case, they are totally ineffective to exclude water from deeper grooves.

BRIEF SUMMARY OF THE INVENTION

In accordance with a preferred embodiment of the present invention, there is provided apparatus and methods for excluding liquid, e.g., water, from within a shallow or deep groove formed in submerged substrate materials without excessively high gas flow from within the device. Such high gas flows disturb processing, for example, welding, by chilling or displacing the molten metal pool, or are wasteful of the inert gas commonly used to provide the liquid/gas boundary position at the perimeter of the device. The gas flow must be sufficiently low so as not to disturb the process being applied, yet sufficiently high to effectively displace the surrounding liquid in the gap between the exclusion device and the work surface. Excess liquid vapor must also be prevented from entering the processing zone, which vapor would likely react with the hot or liquid metal and cause weld defects.

To accomplish the foregoing, in a preferred embodiment of the present invention, there is provided a plurality of thin, flat fingers extending parallel to and lying at opposite ends of an exclusion device which is movable along a work surface area such as a groove in the direction of the groove and parallel to the fingers whereby the fingers maintain a differential geometry corresponding to the geometry of the groove adjacent the leading and trailing edges of the exclusion device. Preferably, the thin, flat fingers lie side-by-side at each of the opposite ends of the device and are spring-biased at one end for pivoting movement to an extended position. Consequently, the free or distal ends of each of the fingers is biased in a direction contacting the work surface forming a seal substantially excluding fluid from within the exclusion device. The sides of the device likewise form a seal with the surface straddling the work area or groove. By forming a substantial radius on the distal ends of the fingers, the finger ends will follow the surface contour of the groove under the bias of the springs to form a sufficient mechanical seal with the work surface. The processing head, for example, a welding head, is located within the device between the leading and trailing rows of fingers and a suitable flow of process or purge gas is provided to displace any water from within the controlled clearance space.

In a further preferred embodiment of the present invention, a plurality of blades or fingers extending parallel to one another and to the direction of movement of the exclusion device along the work surface are mounted for translatory movement at the leading and trailing edges of the exclusion device. Particularly, the translatory fingers are generally elongated in the direction of movement and have spaced vertical slots for mounting the fingers on a pair of guide rods extending transverse to the direction of movement of the device. A spring, preferably having a central transversely extending beam and forwardly and rearwardly extending leaf springs, seals against an upper portion of the housing with the distal ends of the springs engaging upper surfaces of the fingers, biasing the fingers in a downward direction to contact the work surface. It will be appreciated that the fingers not only may translate vertically but can be canted about transverse axes to accommodate irregularities in the work surface. Thus, the lower elongated surfaces of the fingers engage the work surface, forming a seal substantially excluding fluid from within the housing. The gaps between the translatory blades as well as between the leaf springs are sufficiently small that the gas pressure within the exclusion device prevents fluid leakage into the exclusion area.

In a still preferred form of the present invention, the processing apparatus, for example, the welding head or torch, is coupled to the water exclusion device through a spring-biased bellows whereby relative motion between the torch head and the exclusion device along the torch axis is provided. The bellows spring loads the exclusion device housing against the work surface. It will be appreciated that, in use, the torch head is attached to a manipulator or robotic arm which provides the reaction force for maintaining the exclusion device against the work surface under the bias of the bellows spring. Thus, using either the pivoted or translatory fingers previously discussed, the torch head can be maintained in position relative to the work surface. For example, in automated arc voltage controlled welding devices, it is desirable to maintain a constant voltage between the welding head and the work surface. This is typically maintained by a servocontrol responsive to measurements of the voltage drop across the arc between the torch head and work surface. Consequently, the torch head can be motor-driven to drive the torch head toward or away from the work surface while maintaining the work surface free of fluid by the use of compliant seals, the pivoted or translatory fingers and the higher gas pressure within the exclusion device.

In a preferred embodiment according to the present invention, there is provided apparatus for processing a submerged work surface including a groove, comprising a closed housing having an opening and movable relative to the work surface, an array of discrete fingers carried by the housing for pivotal movement substantially independently of one another and generally about parallel axes between retracted positions and positions extending from the housing at locations about at least a portion of the opening, the fingers having tips at distal ends thereof spaced from the axes for engaging or lying in close proximity to the groove in the extended positions of the fingers, means for pivoting the fingers into the extended positions thereof substantially independently of one another enabling the tips of the fingers to follow the groove of the work surface as the housing is displaced relative to the surface and a working head carried by the housing and interiorly of the fingers for processing the surface through the opening.

In a further preferred embodiment according to the present invention, there is provided apparatus for processing a submerged work surface including a groove, comprising a closed housing having an opening and movable relative to the work surface, an array of discrete fingers carried by the housing in side-by-side relation to one another for translational movement substantially independently of one another between retracted positions and positions extending from the housing at locations about at least a portion of the opening, the fingers being elongated in a direction generally normal to the direction of translatory movement and having long edges for engaging or lying in close proximity to the groove in the extended positions of the fingers, means for displacing the fingers into the extended positions thereof substantially independently of one another enabling the edges thereof to follow the groove of the work surface as the housing is displaced relative to the surface and a working head carried by the housing and interiorly of the fingers for processing the surface through the opening.

In a still further preferred embodiment according to the present invention, there is provided apparatus for processing a submerged work surface including as groove, comprising a closed housing having an opening and movable relative to the work surface, an array of discrete fingers carried by the housing for movement substantially independently of one another between retracted positions and positions extending from the housing at locations about at least a portion of the opening, the fingers having surfaces for engaging or lying in close proximity to the groove in the extended positions thereof, means for displacing the fingers into the extended positions thereof substantially independently of one another, enabling the surfaces to follow the groove of the work surface as the housing is displaced relative to the surface and a working head mounted on the housing for movement relative to the housing in directions toward and away from the housing.

In a still further preferred embodiment according to the present invention, there is provided in a device for processing a groove of a submerged work surface wherein the device includes a closed housing, an opening, a working head carried by the housing and an array of discrete fingers carried for pivotal movement substantially independently of one another between retracted positions and positions extending from the housing about at least a portion of the opening, a method for excluding fluid from the work surface, comprising the steps of pivoting the fingers substantially independently of one another relative to the housing enabling tips of the fingers to engage in the groove in extended positions thereof, advancing the device along the work surface with the fingers following the contour of the groove and movable independently of one another to substantially exclude fluid from the work surface exposed to the working head within the housing and operating the working head to process the work surface through the opening as the device is advanced along the work surface with the fingers in continuous engagement along the work surface.

In a still further preferred embodiment according to the present invention, there is provided in a device for processing a groove of a submerged work surface wherein the device includes a closed housing, an opening, a working head carried by the housing and an array of elongated discrete fingers carried for translatory movement substantially independently of one another between retracted positions and positions extending from the housing about at least a portion of the housing to engage a long surface thereof along the groove of the work surface, a method for excluding fluid from the work surface, comprising the steps of translating the fingers substantially independently of one another relative to the housing enabling the long surfaces of the fingers to engage in the groove in extended positions thereof, advancing the device along the work surface with the fingers following the contour of the groove and movable independently of one another to substantially exclude fluid from the work surface exposed to the working head within the housing and operating the working head to process the work surface through the opening as the device is advanced along the work surface with the fingers in continuous engagement along the work surface.

In a still further preferred embodiment according to the present invention, there is provided in a device for processing a groove of a submerged work surface wherein the device includes a closed housing, an opening, a working head coupled to the housing and an array of discrete fingers carried for movement substantially independently of one another between retracted positions and positions extending from the housing about at least a portion of the opening, a method for excluding fluid from the work surface, comprising the steps of extending the fingers substantially independently of one another relative to the housing enabling surfaces of the fingers to engage in the groove in extended positions thereof, advancing the device along the work surface with the fingers following the contour of the groove and movable independently of one another to substantially exclude fluid from the work surface exposed to the working head within the housing, operating the working head to process the work surface through the opening as the device is advanced along the work surface with the fingers in continuous engagement along the work surface and providing for relative movement between the working head and the housing.

DETAILED DESCRIPTION OF THE INVENTION

Figure 1:
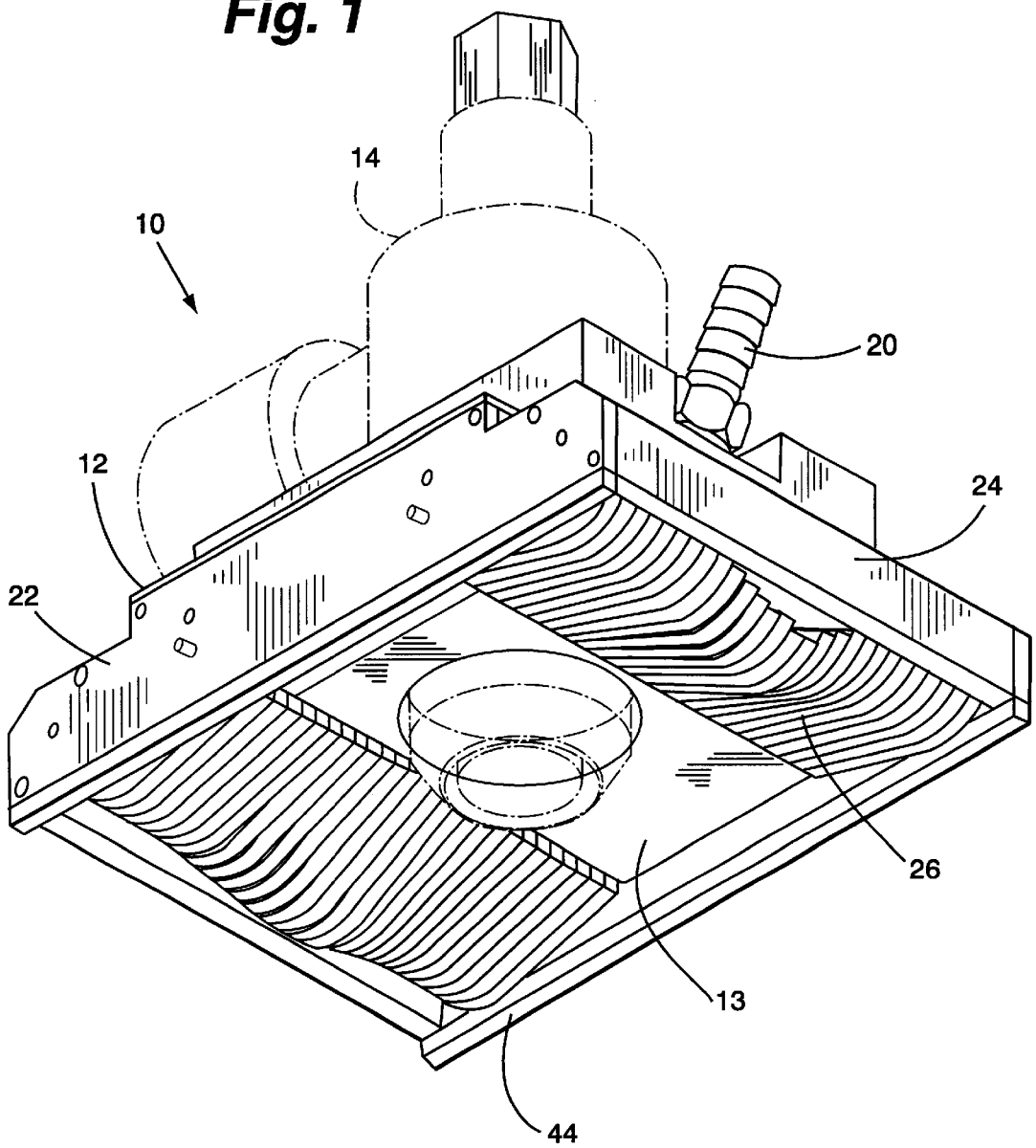
FIG. 1 is a perspective view of an underwater exclusion device constructed in accordance with a preferred embodiment of the present invention as viewed from the underside of the device illustrating fingers for forming a conformable mechanical seal with the work surface.

Referring now to the drawings, particularly to FIG. 1, there is illustrated an exclusion device for underwater or submerged processing applications, generally designated 10. It will be appreciated that the underwater apparatus may, be employed for a variety of applications, fog example, welding, water-jet cleaning, thermal-based surface residual stress improvement and other types of applications. The present description, however, refers to a particular application of the present invention to underwater welding and it will be appreciated that the invention is not, therefore, limited to underwater welding but embraces other applications.

Figure 2:
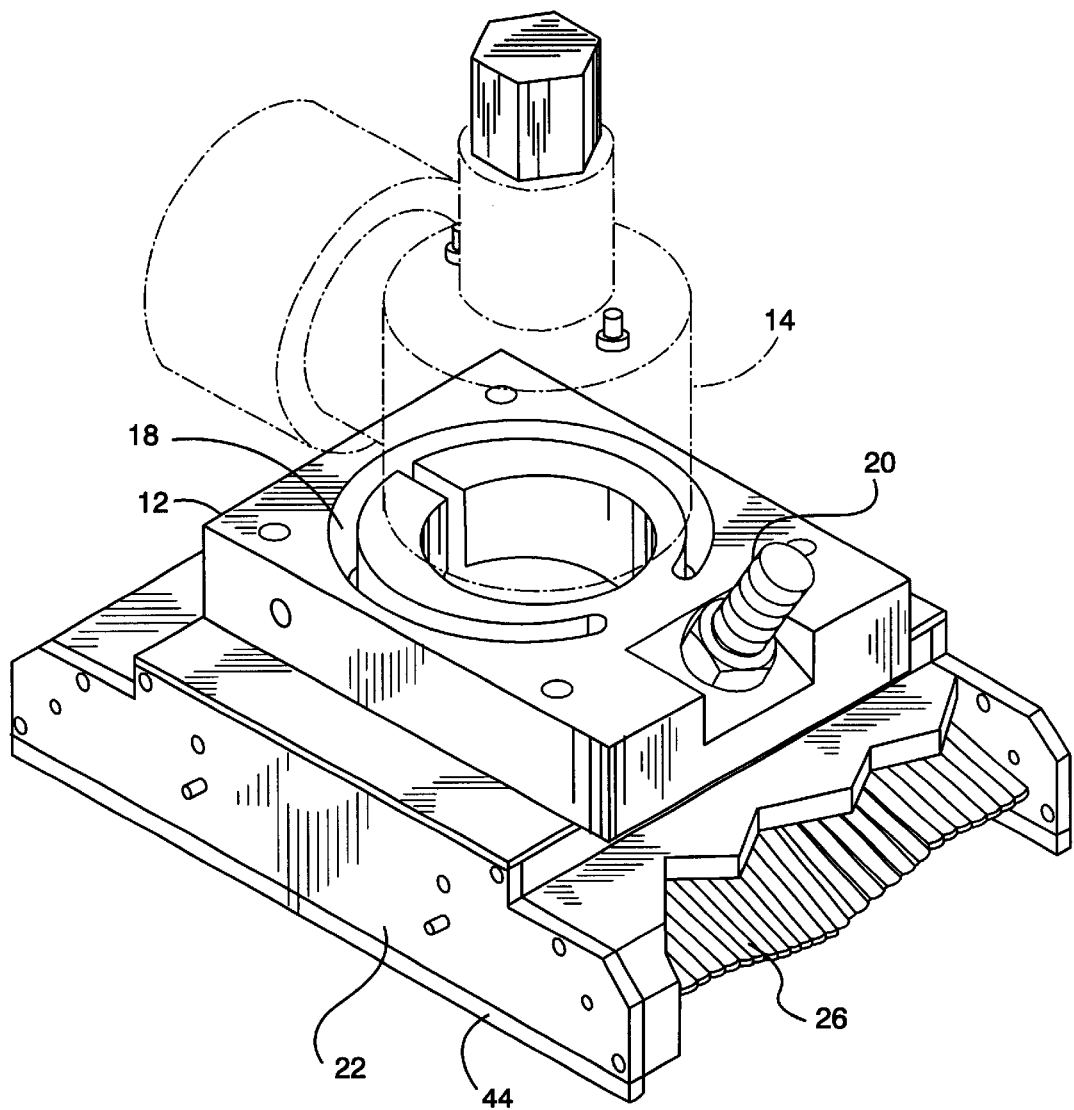
FIG. 2 is a perspective view from the top of the device with parts broken out illustrating the position of the fingers for following a weld groove.

The apparatus 10 includes a housing 12 which is closed at its top, sides and ends and has an opening 13 along its lower face within the confines of its sides and ends. The housing 12 includes an applicator head 14, for example, a welding torch. The applicator head 14 extends through the housing 12 such that the tip of the head 14 is in position to process the work surface through the lower open face 13 of the housing 12, i.e., to weld on a work surface groove. As illustrated in FIG. 2, the housing 12 includes a manifold 18 surrounding the welding torch 14, enabling purge gas for flow into the housing 12 through an inlet 20 to enter an exclusion zone within the housing opening.

Figure 3:
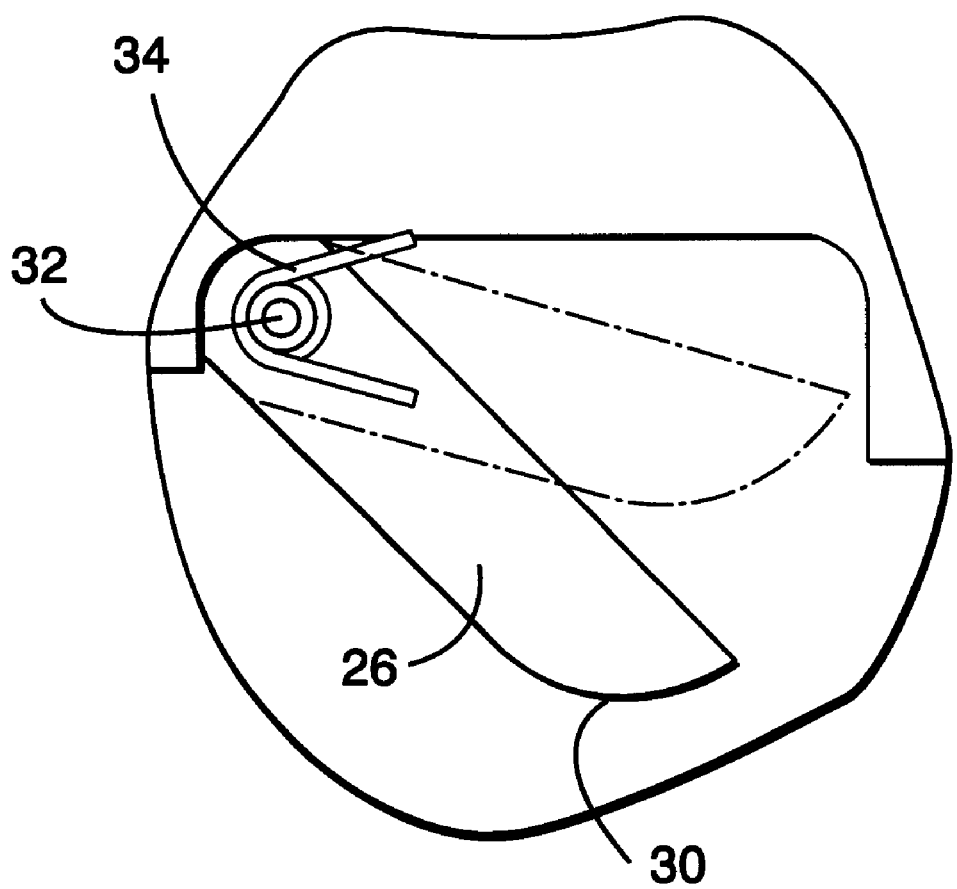
FIG. 3 is an enlarged fragmentary side elevational view of one of the fingers illustrated in retracted and extended positions.

The housing includes side walls 22 and end walls 24. When welding along a groove with the device 10 movable along the groove, the end walls 24 comprise leading and trailing end walls 24. Within the housing 12, there are provided leading and trailing arrays of discrete, individually or independently movable fingers 26. The fingers of each array lie side-by-side and parallel to. one another. That is, groups of fingers lie at opposite ends of the device 10 and are pivotal about generally parallel axes. As best illustrated in FIG. 1, the fingers 26 are elongated in the longitudinal direction of the device 10, i.e., towards the end walls 24 or direction of movement. As best illustrated in FIG. 3, each of the fingers includes a large radiussed tip 30 at its distal end. The opposite end of each finger 26 is pivoted to the housing by means of a mounting rod 32 which passes through the adjacent fingers 26. A discrete spring 34 is provided each finger 26 for pivoting the finger about the axis of pin 32 between retracted positions illustrated by the dot/dash lines in FIG. 3 and the full lines of the fingers in FIG. 3. To ensure that the lateral faces of the fingers 26 lie in close contact with one another, the springs 34 may reside in recesses at the proximal ends of the fingers 26. Suffice to say that the fingers 26 are individually pivotable about the mounting pin 32 between the retracted and extended positions in accordance with the contour of the surface engaged by the radiussed ends 30 of the fingers.

Figure 4:
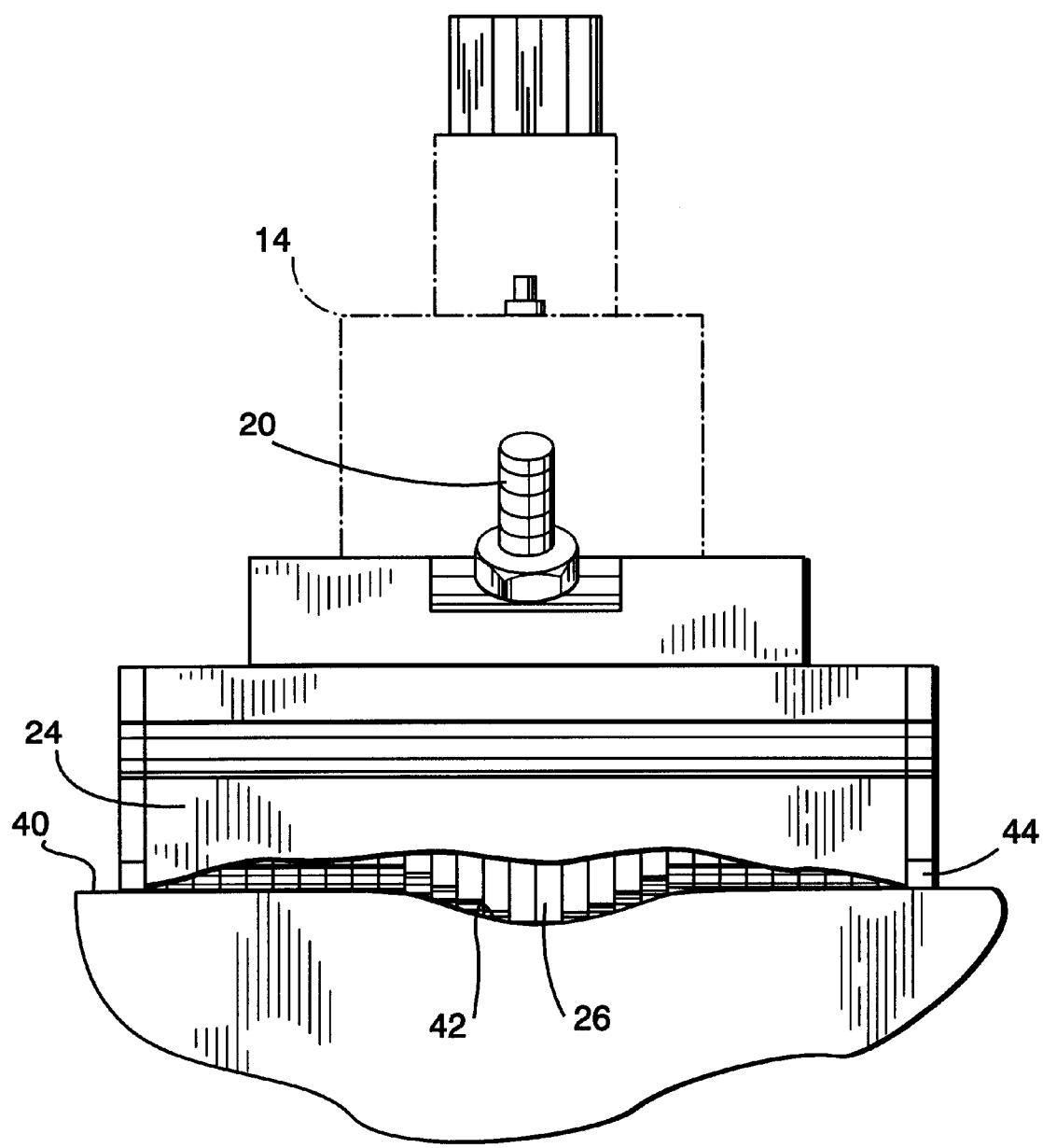
FIG. 4 is a end elevational view illustrating the processing head with the fingers located in a groove, the direction of travel of the device being normal to the drawing figure.
Figure 5:
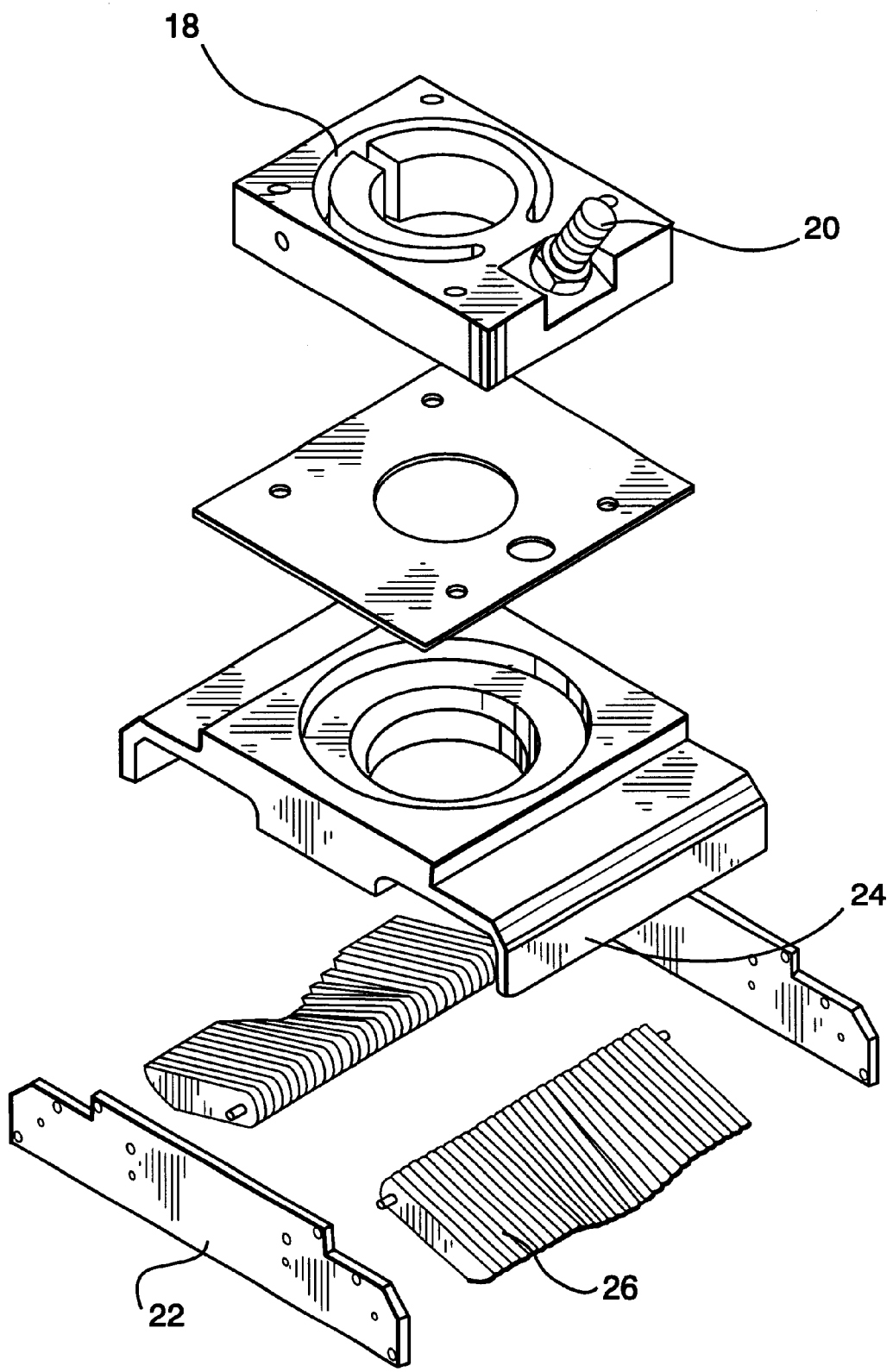
FIG. 5 is an exploded perspective view of the device of FIG. 1.

Illustrated in FIG. 4 is a work surface 40 which includes a groove 42, e.g., a linearly extending groove. The fingers 26 located centrally of the housing extend from their retracted positions under the bias of springs 34 into the groove 42 forming a substantial seal with the surface contours of the groove at opposite ends of the device 10. For those fingers 26 outside of the groove 42, the distal ends 30 thereof engage the working surface straddling the groove 42. It will be appreciated that at least the radiussed portions of the fingers may be coated or hardened to reduce friction between the adjacent fingers whereby the position of each finger relative to its retracted or extended position is determined by the depth of the contoured surface engaged by the radiussed distal end 30 of the finger. The large radius enables the fingers to slide freely over local contour changes and to climb out of the groove edge when the device is moved laterally, for example, to deposit the adjacent weld bead in a multi-pass deposit. The length of the finger is oriented parallel to the primary direction of travel of the housing 10 along the groove.

The side walls 22 of the device may have appropriate conformable seals 44 formed along their lower edges for engaging and sealing with the work surface 40 straddling the groove 42. It will therefore be appreciated that as the housing 10 is displaced along the groove in the direction of the groove, i.e., parallel to the longitudinal extent of the fingers 26, the individual fingers are biased to engage their distal ends along the contours of the work surface, including the groove 42. Note that both the leading and trailing arrays of fingers engage in the grooves. Thus, the leading and trailing array of fingers, together with the side walls 22 of device 10, form an exclusion area within the opening 13 of device 10, inhibiting egress of water into the opening and enabling operation of the torch. The purged gas also assists in maintaining the water from within the exclusion area.

Figure 6:
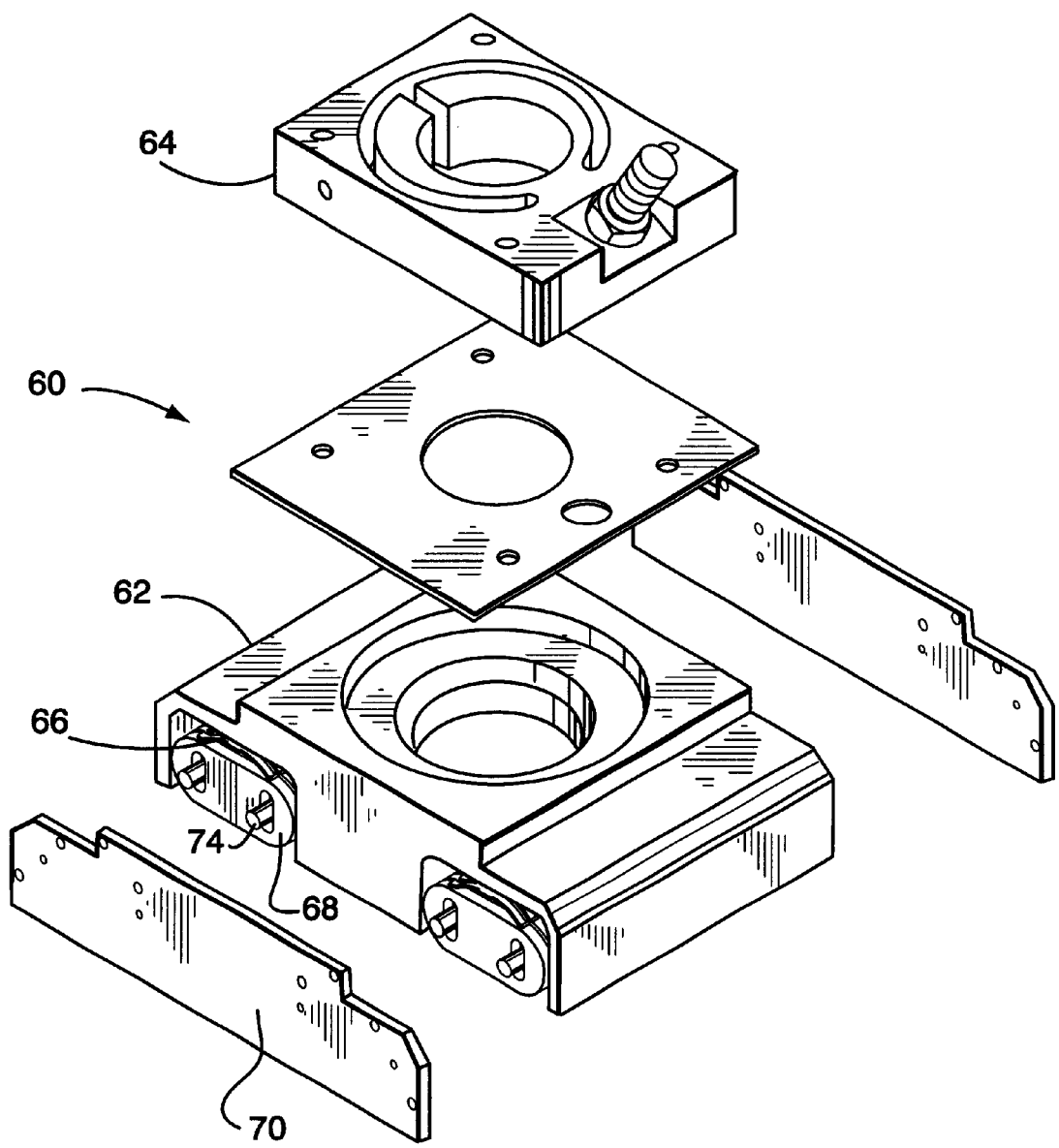
FIG. 6 is a view similar to FIG. 5 illustrating a further preferred embodiment of the present invention employing translatory mounted fingers.
Figure 7:
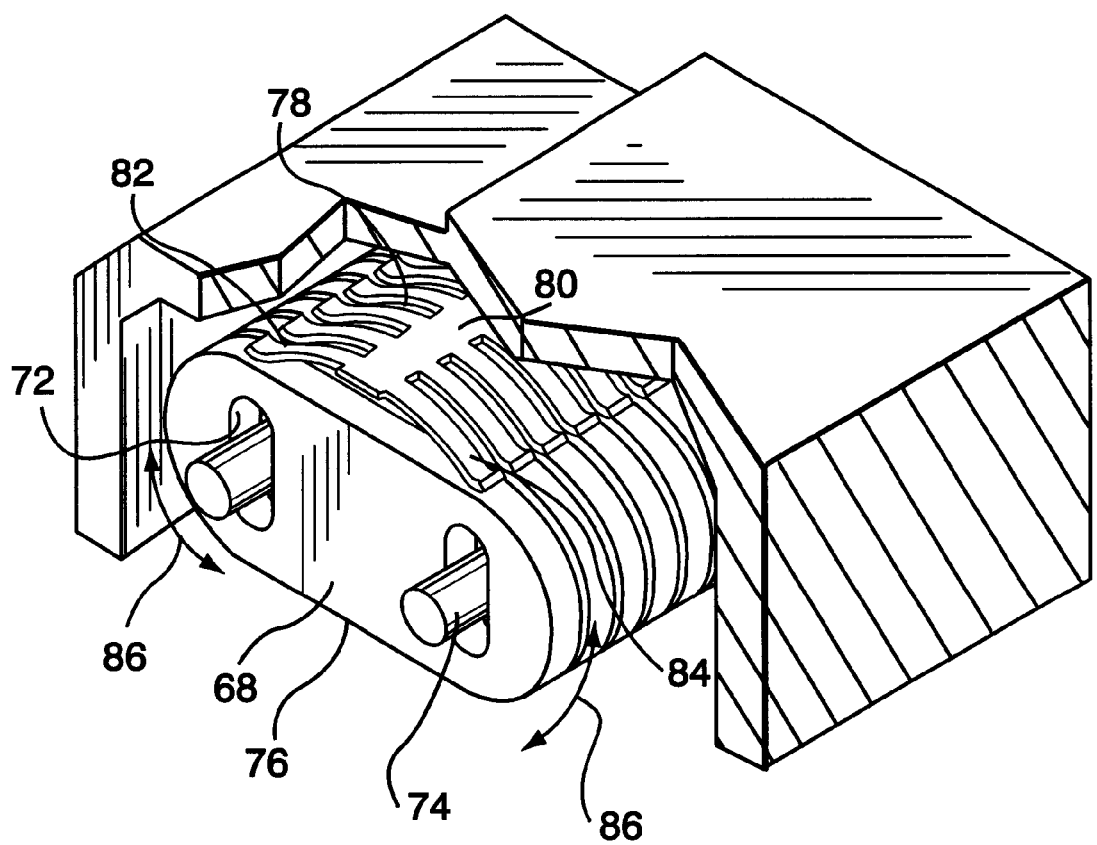
FIG. 7 is an enlarged perspective view of the translatory fingers with portions of the housing therefor broken out for ease of illustration.

Referring now to the preferred embodiment of the present invention illustrated in FIGS. 6 and 7, there is illustrated a further form of exclusion device, generally designated 60, including a housing 62 having a manifold 64 for mounting an applicator head, not shown in this drawing figure but similar to applicator head 14 of the prior embodiment. Leading and forward edges in the direction of travel of the exclusion device along the work surface are provided with channels, for example, channel 66, for housing water exclusion translatory blades or fingers 68. An array of fingers 68 at each of the opposite ends of the housing 62 are mounted in side-by-side parallel relation to one another and parallel to the direction of movement of the device along the work surface. The side walls 70 enclose the sides of the housing 62 and the translatory fingers 68.

As best illustrated in FIG. 7, each finger 68 is preferably oblong in shape in the direction of movement of housing 62 and has straight upper and lower edges or surfaces joined by rounded opposite ends. Each finger also has a pair of longitudinally spaced vertically extending slots 72. The slots 72 receive rods 74 which extend transversely between opposite sides of housing 62. Thus, the flat sides of the fingers 68 engage one another and the fingers are free for vertical translatory movement within the limits imposed by the vertical slots 72 and rods 74. The fingers 68 are also free for canting movement in a vertical plane in the direction of travel of the housing 62.

To maintain the lower longitudinally extending edges 76 of the fingers 68 engaged along the work surface, a spring 78 is fixed to the housing 62 within the channel 66 and biases each finger 68 in a direction toward the work surface. In a preferred embodiment, spring 68 includes a central beam 80 extending transversely from side to side of the housing 62, sealing against the upper interior surface thereof, and includes a plurality of forwardly and rearwardly extending leaf springs 82 and 84, respectively. The distal ends of the springs 82 and 84 engage the upper surfaces of the fingers 68 at locations directly above the slots 72, thereby biasing the fingers 68 uniformly in a downward direction but permitting a canting of the fingers 68 relative to one another, for example, in either of the directions of the arrows 86.

While the spacing between the channels 66 and the fingers 68 afford small clearances, which, to that extent, exclude fluid from within the housing 62, the fingers 68 in conjunction with the spring 78, as well as the gas pressure within the housing, excludes fluid from the interior of the housing. That is, the gaps between the transversely adjacent leaf springs 82 and 84 and any leakage paths through gaps between adjacent fingers 68 are sufficiently small such that the pressure within the housing provides an outflow of gas therethrough excluding fluid from within the housing. It will be appreciated that the fingers 68 thus are biased from the housing in a direction toward the work surface for sealing against the work surface. Any irregularities along the work surface are accommodated by the translatory and/or canting movement of the fingers to maintain the fluid exclusion seal.

Figure 8:
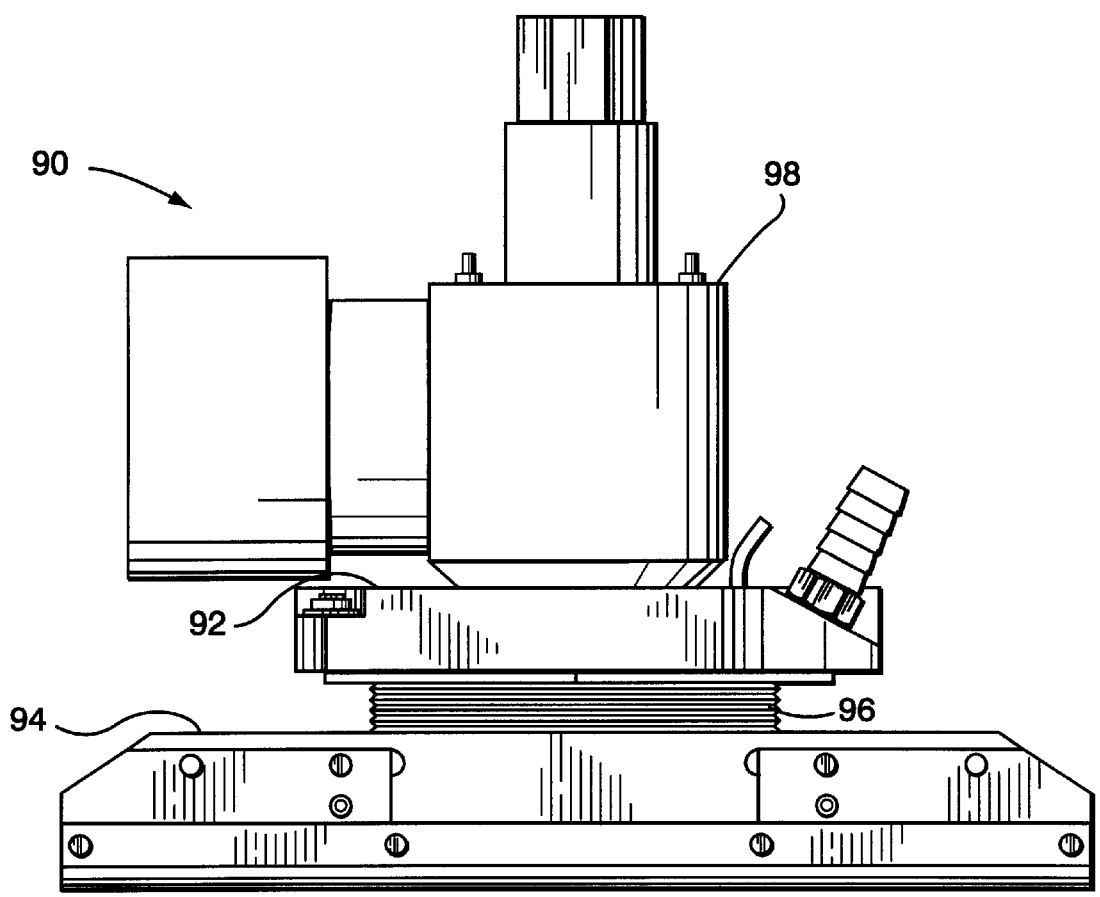
FIG. 8 is a side elevational view of a processing head and exclusion device coupled to one another by a spring-biased bellows in accordance with a further preferred embodiment of the present invention.
Figure 9:
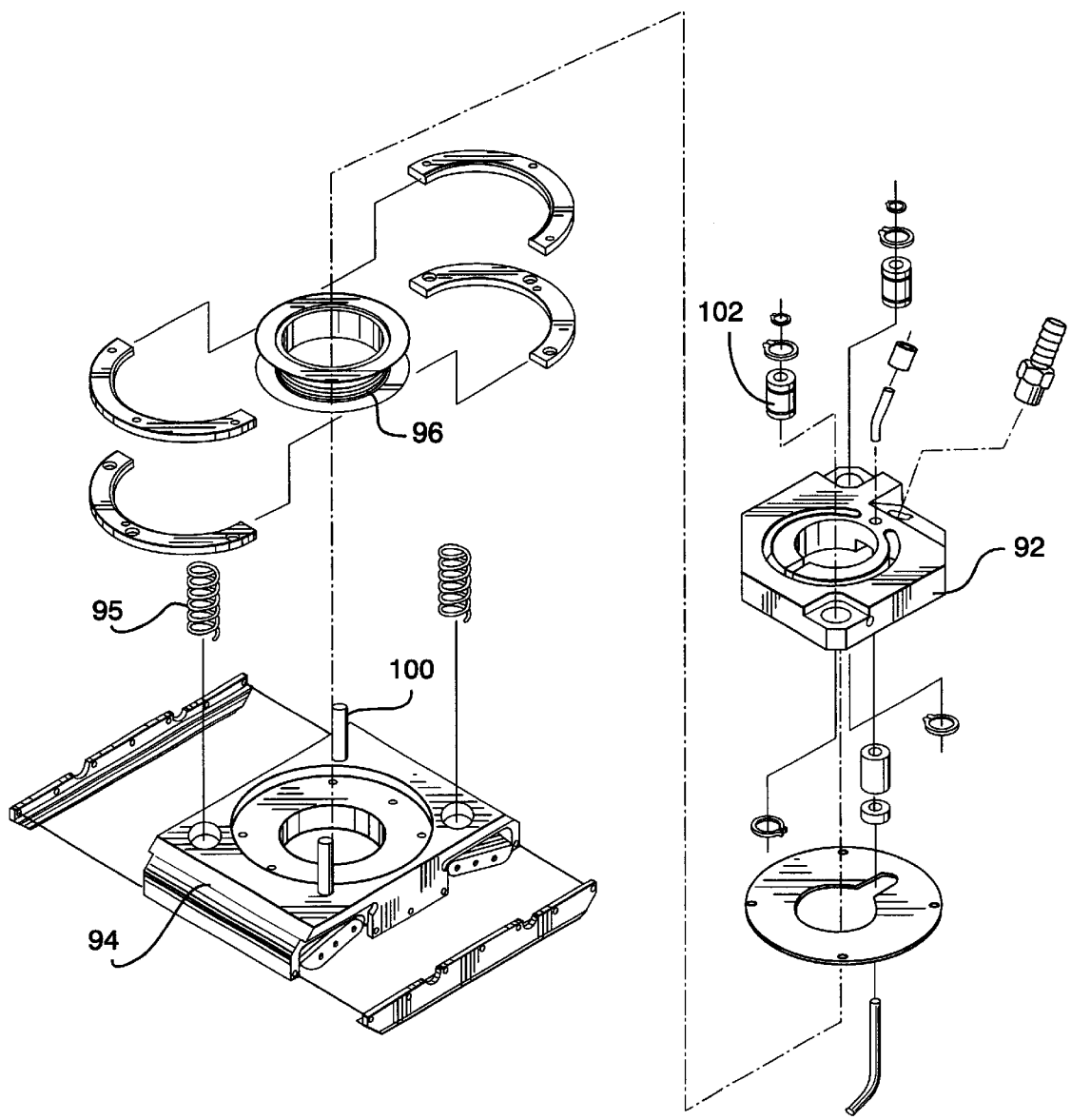
FIG. 9 is an exploded perspective view of various parts forming the processing head and exclusion device of FIG. 8.

Referring now to FIGS. 8 and 9, there is illustrated a further preferred embodiment of a water exclusion device, generally designated 90, in accordance with a preferred embodiment of the present invention. The device 90 includes an applicator head mount 92 and a housing 94 interconnected by a spring-biased bellows 96. The applicator head mount 928 mounts the applicator head, for example, a welding torch, which is secured to a robotic or manipulator arm, not shown. The housing 94 for excluding fluid from within the processing apparatus may be of the type illustrated in either embodiment of FIGS. 1–5 or FIGS. 6–7. In this form, however, the bellows 96 permits relative movement between the applicator head and the housing 94. The bellows 96 may be formed of any flexible material impervious to fluid and may contain an embedded spring or a separate spring inside the bellows for interconnecting the mount 92 and housing 94. Mounting the applicator head for movement relative to the housing is particularly significant in automatic welding using an arc voltage control so that a constant voltage can be maintained between the applicator head and the work. It will be appreciated that the voltage drop between the applicator head and the work surface can be measured and through a servosystem, not shown, the manipulator or robotic arm can drive the applicator head toward or away from the work surface and relative to the housing 94 in order to maintain a constant voltage, e.g., a constant arc length, while simultaneously housing 94 excludes fluid from the work area.

As illustrated in FIG. 9, stability may be afforded to the applicator head mount 92 and housing 94 by the use of pins 100 upstanding from housing 94 for reception in linear bearings 102 extending through openings at the corners of a diagonal along and on mount 92. The linear bearings 102 enable the housing 94 to move only on the torch axis without wobble toward and away from housing 94. If linear vertical motion with wobble is desired between mount 92 and housing 94, the linear bearings are omitted. Additionally, compression springs 95 may be provided at the opposite diagonal corners of the mount 92 acting between the mount 92 and housing 94 to augment the bias afforded by the bellows spring. It will be appreciated, however, that neither the linear bearings or compression springs are essential. The bias of the bellows spring maintains the housing 94 and the fingers carried thereby, as well as the compliant seals in sealing engagement along the work surface as the applicator head is moved by the manipulator or robotic arm along the work surface.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for processing a submerged work surface including a groove, comprising:
   a closed housing having an opening and movable relative to the work surface;
   an array of discrete fingers carried by said housing for pivotal movement substantially independently of one another and generally about parallel axes between retracted positions and positions extending from said housing at locations about at least a portion of said opening;
   said fingers having tips at distal ends thereof spaced from said axes for engaging or lying in close proximity to the groove in said extended positions of said fingers;
   means for pivoting said fingers into said extended positions thereof substantially independently of one another enabling the tips of the fingers to follow the groove of the work surface as the housing is displaced relative to the surface; and
   a working head carried by said housing and interiorly of said fingers for processing said surface through said opening.

2. Apparatus according to claim 1 wherein said pivoting means includes springs for biasing said fingers for movement into said extended positions thereof.

3. Apparatus according to claim 1 wherein said working head includes a welding torch.

4. Apparatus according to claim 1 wherein said fingers lie side-by-side relative to one another and are elongated, said tips having a radius for engaging the work surface, a first group of said fingers along an end of said housing being pivotal about a common axis.

5. Apparatus according to claim 4 wherein a second group of said fingers lies along an end of said housing opposite said one end and are pivotal about a second common axis.

6. Apparatus according to claim 5 wherein said fingers of said first and second groups thereof extend from their axes in respective opposite directions.

7. Apparatus according to claim 5 wherein the housing has seals extending generally normal to said axes for sealing against the work surface.

8. Apparatus according to claim 5 wherein each of the fingers are biased for movement and into the extended position by a spring.

9. Apparatus according to claim 1 wherein said fingers are movable independently of one another.

10. Apparatus for processing a submerged work surface including a groove, comprising:
    a closed housing having an opening and movable relative to the work surface;
    an array of discrete fingers carried by said housing in side-by-side relation to one another for translational movement substantially independently of one another between retracted positions and positions extending from said housing at locations about at least a portion of said opening;
    said fingers being elongated in a direction generally normal to the direction of translatory movement and having long edges for engaging or lying in close proximity to the groove in said extended positions of said fingers;
    means for displacing said fingers into said extended positions thereof substantially independently of one another enabling said edges thereof to follow the groove of the work surface as the housing is displaced relative to the surface; and
    a working head carried by said housing and interiorly of said fingers for processing said surface through said opening.

11. Apparatus according to claim 10 wherein said displacing means includes springs for biasing said fingers for movement into said extended positions thereof, including a welding torch.

12. Apparatus according to claim 10 wherein each said finger is carried by said housing for canting movement in a plane containing said finger.

13. Apparatus according to claim 10 including a pair of guide rods carried by said housing and spaced from one another, each finger having slots elongated generally in the direction of movement of the fingers between extended and retracted positions, said rods extending through said slots, respectively, enabling said translatory movement of said fingers between said extended and retracted positions.

14. Apparatus according to claim 13 wherein said fingers are carried by said rods for canting movement in planes containing said fingers.

15. Apparatus for processing a submerged work surface including as groove, comprising:
    a closed housing having an opening and movable relative to the work surface;
    an array of discrete fingers carried by said housing for movement substantially independently of one another between retracted positions and positions extending from said housing at locations about at least a portion of said opening;
    said fingers having surfaces for engaging or lying in close proximity to the groove in said extended positions thereof;
    means for displacing said fingers into said extended positions thereof substantially independently of one another, enabling said surfaces to follow the groove of the work surface as the housing is displaced relative to the surface; and
    a working head mounted on said housing for movement relative to said housing in directions toward and away from said housing.

16. Apparatus according to claim 15 including a spring-biased bellows interconnecting said working head and said housing relative to one another, said bellows being fluid-tight to exclude transmission of fluid into the housing.

17. Apparatus according to claim 15 including a guide for enabling movement of said working head substantially solely in a linear direction toward and away from said housing.

18. In a device for processing a groove of a submerged work surface wherein the device includes a closed housing, an opening, a working head carried by said housing and an array of discrete fingers carried for pivotal movement substantially independently of one another between retracted positions and positions extending from said housing about at least a portion of said opening, a method for excluding fluid from the work surface, comprising the steps of:

pivoting the fingers substantially independently of one another relative to the housing enabling tips of the fingers to engage in the groove in extended positions thereof;

advancing the device along the work surface with the fingers following the contour of the groove and movable independently of one another to substantially exclude fluid from the work surface exposed to the working head within the housing; and operating the working head to process said work surface through said opening as the device is advanced along the work surface with the fingers in continuous engagement along the work surface.

19. A method according to claim 18 including biasing said fingers for movement into said extended positions thereof.

20. A method according to claim 18 including providing a second array of discrete fingers carried by said housing for movement substantially independently of one another and the first-mentioned array of fingers between retracted positions and positions extending from said housing about another portion of said opening opposite the first mentioned portion of the opening, and including the step of extending the fingers of the second array thereof to engage the work surface as the device is advanced therealong.

21. A method according to claim 20 wherein the work surface comprises a linear extending groove, and including providing the first and second arrays of fingers elongated in the linear direction of said groove with the fingers of each array thereof lying parallel to one another, and advancing said device along said groove in the linear direction thereof.

22. A method according to claim 18 including providing for relative movement between said working head and said housing in a direction generally normal to the work surface.

23. In a device for processing a groove of a submerged work surface wherein the device includes a closed housing, an opening, a working head carried by said housing and an array of elongated discrete fingers carried for translatory movement substantially independently of one another between retracted positions and positions extending from said housing about at least a portion of said housing to engage a long surface thereof along the groove of the work surface, a method for excluding fluid from the work surface, comprising the steps of:

translating the fingers substantially independently of one another relative to the housing enabling the long surfaces of the fingers to engage in the groove in extended positions thereof;

advancing the device along the work surface with the fingers following the contour of the groove and movable independently of one another to substantially exclude fluid from the work surface exposed to the working head within the housing; and operating the working head to process said work surface through said opening as the device is advanced along the work surface with the fingers in continuous engagement along the work surface.

24. A method according to claim 23 including biasing said fingers for movement into said extended positions thereof.

25. A method according to claim 23 including providing a second array of discrete fingers carried by said housing for movement substantially independently of one another and the first-mentioned array of fingers between retracted positions and positions extending from said housing about another portion of said opening opposite the first mentioned portion of the opening, and including the step of extending the fingers of the second array thereof to engage the work surface as the device is advanced therealong.

26. A method according to claim 25 wherein the work surface comprises a linear extending groove, and including providing the first and second arrays of fingers elongated in the linear direction of said groove with the fingers of each array thereof lying parallel to one another, and advancing said device along said groove in the linear direction thereof.

27. A method according to claim 23 including providing for canting movement of said fingers in planes containing said fingers.

28. A method according to claim 23 including providing for relative movement between said working head and said housing in a direction generally normal to the work surface.

29. In a device for processing a groove of a submerged work surface wherein the device includes a closed housing, an opening, a working head coupled to said housing and an array of discrete fingers carried for movement substantially independently of one another between retracted positions and positions extending from said housing about at least a portion of said opening, a method for excluding fluid from the work surface, comprising the steps of:

extending the fingers substantially independently of one another relative to the housing enabling surfaces of the fingers to engage in the groove in extended positions thereof;

advancing the device along the work surface with the fingers following the contour of the groove and movable independently of one another to substantially exclude fluid from the work surface exposed to the working head within the housing;

operating the working head to process said work surface through said opening as the device is advanced along the work surface with the fingers in continuous engagement along the work surface; and providing for relative movement between said working head and said housing.

30. A method according to claim 29 including biasing said fingers for movement into said extended positions thereof.

31. A method according to claim 29 including providing a second array of discrete fingers carried by said housing for movement substantially independently of one another and the first-mentioned array of fingers between retracted positions and positions extending from said housing about another portion of said opening opposite the first mentioned portion of the opening, and including the step of extending the fingers of the second array thereof to engage the work surface as the device is advanced therealong.

32. A method according to claim 31 wherein the work surface comprises a linear extending groove, and including providing the first and second arrays of fingers elongated in the linear direction of said groove with the fingers of each array thereof lying parallel to one another, and advancing said device along said groove in the linear direction thereof.

\* \* \* \* \*

UNITED STATES PATENT AND TRADEMARK OFFICE
CERTIFICATE OF CORRECTION

PATENT NO.    : 6,373,019 B1
DATED         : April 16, 2002
INVENTOR(S)   : Offer et al.

It is certified that error appears in the above-identified patent and that said Letters Patent is hereby corrected as shown below:

Column 6,
Line 26, delete "fog" and insert -- for --.

Column 8,
Line 34, delete "928" and insert -- 92 --.

Signed and Sealed this

Thirty-first Day of December, 2002

JAMES E. ROGAN
*Director of the United States Patent and Trademark Office*